Figure 1:
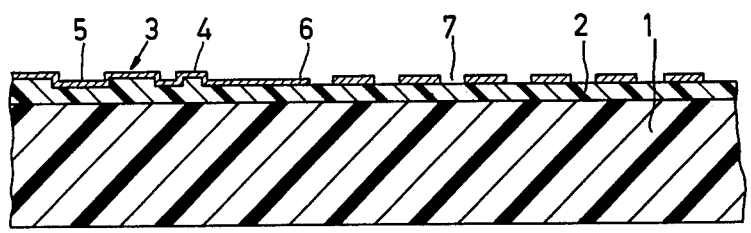

United States Patent [19]

Zalm et al.

[11] Patent Number: 4,476,214
[45] Date of Patent: Oct. 9, 1984

[54] OPTICAL INFORMATION DISK COMPRISING TELLURIUM, SELENIUM AND ANTIMONY

[75] Inventors: Pieter Zalm, Geldrop; Bernardus A. J. Jacobs; Adriaan W. De Poorter, both of Eindhoven, all of Netherlands

[73] Assignee: U.S. Philips Corporation, New York, N.Y.

[21] Appl. No.: 310,685

[22] Filed: Oct. 13, 1981

[30] Foreign Application Priority Data

Oct. 16, 1980 [NL] Netherlands ................. 8005693

[51] Int. Cl.³ .................... G03C 1/72; G02B 27/22
[52] U.S. Cl. ..................................... 430/270; 430/346; 430/495; 430/964; 346/135.1
[58] Field of Search ............. 430/346, 495, 964, 270; 346/135.1, 76 L

[56] References Cited

U.S. PATENT DOCUMENTS 3,990,084 11/1976 Hamisch et al. ................. 430/495
4,290,075 9/1981 Jacobs et al. .................. 346/135.1

FOREIGN PATENT DOCUMENTS 7805605 11/1978 Netherlands .

Primary Examiner—Richard L. Schilling
Attorney, Agent, or Firm—Norman N. Spain

[57] ABSTRACT

An optical information disk in which information can be written and read optically and which has a substrate plate which on at least one side has a recording layer which satisfies the formula $Te_xSe_ySb_zS_q$ wherein $x=55-85$ at. %, $y=13-30$ at. % $z=1-12$ at. %, $q=0-10$ at. % and $x+y+z+q=100$. Suitable recording layers are $Te_{60}Se_{25}Sb_{10}S_5$ and $Te_{75}Se_{15}Sb_5S_5$.

5 Claims, 2 Drawing Figures

OPTICAL INFORMATION DISK COMPRISING TELLURIUM, SELENIUM AND ANTIMONY

The invention relates to an optical information disk in which information can be written and read optically and which comprises a substrate plate which, on at least one side, has an ablative recording layer comprising the elements tellurium, selenium and antimony.

Such an information disk is known from published Netherlands Patent Application No. 7805605 (PHN 9130) in the name of Applicants. In the known information disk a recording layer having the composition $Te_{33}Sb_{33}Se_{34}$ is used.

An ablative recording layer is understood to mean herein a layer in which holes or recesses are formed by exposure to energy intensive light, for example laser light, modulated in accordance with the information to be recorded. For recording information, the disk is rotated at a speed of approximately 150–1800 rpm and exposed to pulsated laser light which is focused on the recording layer. The pulse time is low and is, for example, from $10^{-6}$ to $10^{-8}$ seconds, for example $5.10^{-7}$ seconds. The power of the laser used is also low and, for example, has a value of 1–20 mW on the disk. As a result of the exposure to pulsated laser light, the recording layer melts in the exposed places. The recording material retracts in the formed melting areas under the influence of differences in surface energy; a hole or recess having a thickened edge portion being formed. The information bits thus obtained have small diametrical dimensions in the order of magnitude from 0.5–2 μm. The density of the recording layer is roughly 15–50 nm.

The recorded information is read with laser light which is considerably weaker than the writing laser light and is, for example, a factor 10 weaker. The detection of the information bits is based on the changed reflection or transmission of the recording layer at the area of the recesses or holes (bits). Reading in reflection has the advantage that the forward and reflected laser light beams traverse the same optical path for the greater part so that fewer optical elements, such as, lens-objectives are needed in the recording and reading apparatus. Both upon writing and reading the laser light beam is focused on the recording layer preferably through the substrate plate. The dust particles, scratches and the like present on the surface of the substrate plate then fall beyond the depth of focus of the lens objective which focuses the laser light so that such contaminations have no adverse influence on the quality of the recorded and read information. In the above-mentioned case the substrate plate should be transparent with respect to the laser light used and be manufactured, for example, from glass or a transparent synthetic resin, for example, polyvinyl-chloride and polymethyl-methacrylate. If desired, an auxiliary layer, such as a light-cured lacquer layer having an optically readable information track may be provided between the substrate plate and the recording layer. The information track comprises information areas situated alternately at a higher and at a lower level which are read by reflection via the transparent substrate plate by means of laser light. The detection of the information areas is based on phase differences between the forward and reflected laser light beams. The level difference between the areas is a quarter wavelength of the laser light by which light the areas are read, and is, for example, 0.15 μm. The length dimensions of the information areas vary in accordance with the stored information and are approximately 0.2 to 3 μm. The stored information comprises, for example, data for the control of the laser light beam with which information is written, for example, data as regards the speed and location of recording.

The composition of the recording layer is of essential importance to obtain good results in which small variations in the composition influence the complex process of the hole (bit) formation in various points. On the basis of the knowledge and insight gained by Applicants in the processes and process parameters occurring in the formation of holes, an optical recording disk having an ablative recording layer has been developed which gives optimum results with respect to, inter alia, stability, sensitivity to laser light and bit definition.

More in particular the invention provides an optical recording disk of the type mentioned in the opening paragraph which is characterized in that the composition of the recording layer satisfies the formula $Te_x Se_y Sb_z S_q$ wherein $X = 55-85$ at%, $y = 13-30$ at%, $z = 1-12$ at%, $q = 0-10$ at% and $x+y+z+q = 100$.

The recording layer used in the optical recording disk according to the invention has in particular a favourably high absorption for laser light in the visible and infrared parts of the spectrum. As a result of this, an AlGaAs laser may advantageously be used which has an emission wavelength of approximately 800–850 nm and which is particularly interesting due to the comparatively low cost-price and the favourable small dimensions.

The tellurium content in the recording layer determines the laser light sensitivity of the layer to a considerable extent. The higher the tellurium content, the more sensitive is the layer, that is to say the lesser laser light energy is necessary to provide a hole (bit) in the layer. Tellurium is considerably moisture- and oxidation-sensitive in which transparent tellurium oxides are formed so that the sensitivity of tellurium as a result of said decomposition decreases considerably with time. This instability of tellurium is suppressed for the greater part by the selenium present in the recording layer in the above-indicated quantity. It follows that at higher selenium content the stability of the recording layer is also larger at the expense of a comparatively small loss of sensitivity. Within the above-indicated tolerances in tellurium and selenium contents an expert can make a choice as regards a desired sensitivity and stability. When the life of the recording layer is a prime requirement, as is the case when the recording layer comprises information which is to be stored for a very long period of time, for example, information relating to or consisting of X-ray images of patients in which a storage time of 30 years is generally required, a comparatively high selenium content of approximately 22–30 at% and a tellurium content of approximately 55–65 at% will be chosen. When on the contrary, the sensitivity is a prime requirement and a small life of, for example, 10 years will suffice, a recording layer is to be preferred having a comparatively high tellurium content of 70–85 at% and a selenium content of 13–22 at.%.

The antimony present in the recording layer according to the invention in the indicated quantity, has a particular meaning for and influence on the properties of the recording layer. Surprisingly the antimony increases the sensitivity of the recording layer to a considerable extent, while in addition the stability of the layer is not attacked and even shows an improvement. This particular behaviour of antimony occurs with a quantity used of 1–12 at.%. Below the limit of 1 at.% the quantity of antimony is too small for a significant effect. When more than 12 at% of antimony is used the sensitivity and stability of the layer become just less.

The above-described favourable phenomenon is difficult to interpret. It is certain that mixed crystals of $Sb_2Se_3$ and $Sb_2S_3$ (if S is present in the layer) are formed in the layer. Diffusion of Sb-containing compounds to the surface and oxidation to antimony oxides, such as $Sb_2O_3$ and $Sb_2O_5$, causes the surface tension of the layer to increase so that the sensitivity to laser light increases.

The increased surface energy results in that along the circumferential edge of a melting area formed under the influence of laser light in the recording layer, a jump in the surface energy occurs so that the melting area at a smaller diameter is drawn open while forming a hole so that less laser light energy is required. The said jump in the surface energy is a result of the fact that in the melting area mixing of constituents of the recording layer takes place so that the surface energy of the melted parts of the recording layer is lower than that of the solid parts of the layer.

If desired, the recording layer may comprise a maximum quantity of 10 at.% of sulphur. When sulphur is used the amorphous character of the layer decreases. The impression exists that areas of fine crystals are formed in an amorphous matrix. The sensitivity and stability of the layer are increased when sulphur is used. It is to be noted that with a sulphur percentage of more than the above-mentioned 10 at.% the growth of coarser crystallites increases. The layer then becomes significantly more insensitive and has a lower hole (bit) quality.

In a favourable embodiment of the information disk in accordance with the invention a recording layer is used of the above-mentioned formular $$Te_xSe_ySb_zS_q$$

wherein x, y, z and q have the above-mentioned meanings and furthermore y satisfies the condition $$y = ax + 1.5z - q$$

wherein a has the value 0.15 to 0.30.

This preferred embodiment is based on the insight gained by Applicants that an optimum life is obtained if, in addition to the selenium ($Sb_2Se_3$) bound to antimony, 15–30 at.% of free selenium calculated on the quantity of tellurium is present which can dissolve in the tellurium.

Very favourable results are achieved when a recording layer of the composition $Te_{60}Se_{25}Sb_{10}S_5$, $Te_{75}Se_{15}Sb_{10}$ or $Te_{75}Se_{15}Sb_5S_5$ is used.

Figure 2:
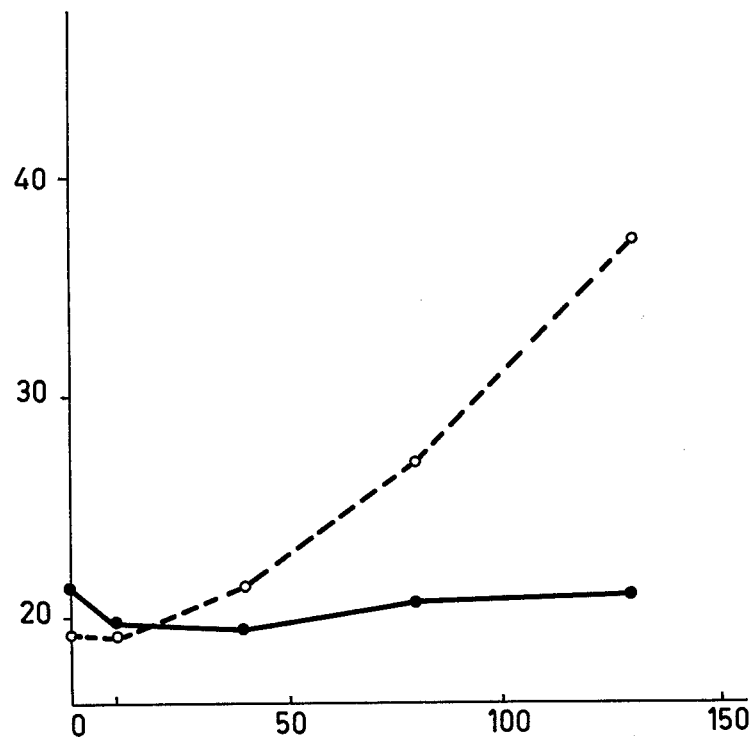

The invention will now be described in greater detail with reference to the embodiment and the accompanying drawing, in which FIG. 1 is a cross-sectional view of an optical information disk according to the invention, and FIG. 2 shows the graphic relationship between the laser light transmission of the disk in accordance with the invention and a known disk as a function of the number of test days in a cyclic moisture test.

EXAMPLE

A substrate plate referenced 1 in FIG. 1 and having a thickness of 1.3 mm is provided on one side with a light-cured lacquer layer 2 on the basis of acrylic acid esters. Lacquer layer 2 has a thickness of 30 μm and has throughout its surface an information track 3, sometimes termed servo track, which can be read optically with laser light and which comprises information with respect to the recording of data such as information about the speed and site of recording. For that purpose the information track has a crenellated profile of information areas 4 situated at a higher level and information areas 5 situated at a lower level. The difference in height of the areas is ¼ wavelength of the reading laser light and is approximately 0.15 μm. The longitudinal dimensions vary in accordance with the stored information and are approximately 0.3–3 μm. Lacquer layer 2 is covered with a recording layer 6 consisting of $Te_{60}Se_{25}Sb_{10}S_5$ in a thickness of 30 nm. In respect of recording of data, recording layer 6 is exposed, in the parts not provided with the servo track, to laser light which is approximately a factor 10 more intense in energy than the reading laser light which scans the servo track. The recording laser light is focused on the recording layer via substrate plate 1 and is pulsated in accordance with the information to be recorded. The pulse time is 100 ns. The data recorded in layer 6 have a binary character in which the information bits consist of holes 7 formed in the recording layer 6.

Tests have been carried out with the above-described information disk according to the invention as well as with a disk which, instead of the above-mentioned recording layer, comprised a recording layer of $Te_{33}Sb_{33}Se_{34}$.

In a first series of tests the threshold sensitivity of the information disk was determined. For that purpose the recording layer was exposed to pulsated laser light (pulse time = 100 ns) of increasing energy until a hole was formed in the recording layer. It was established that the threshold sensitivity of the recording layer of $Te_{60}Se_{25}Sb_{10}S_5$ used in the disk according to the invention had a value of 0.50 nJ per pulse and that of the known recording layer ($Te_{33}Sb_{33}Se_{34}$) had a value of 0.80 nJ per pulse. The same test series was carried out for the determination of the sensitivity for a hole provided in the recording layer in a diameter of 0.7 μm. The sensitivity for a 0.7 μm hole in the $Te_{60}Se_{25}Sb_{10}S_5$ recording layer was 0.91 nJ per pulse. The sensitivity of a $Te_{33}Sb_{33}Se_{34}$ recording layer was higher than 1.10 nJ per pulse.

In a third series of tests the average daily increase of the so-called bit-error rate ($\Delta BER$) was determined. Herewith is meant the average increase per day of the ratio between the number of errors and the number of recordings (bits). Errors, for example, in the form of so-called pinholes, that is to say small holes, may occur in that the recording layer works loose locally and is damaged or in that, for example, the layer becomes locally transparent as a result of oxidation. For the determination of the bit error rate the information disk according to the invention, as well as an information disk provided with a known recording layer consisting of $Te_{33}Sb_{33}Se_{34}$ was subjected to a standard ageing test, the so-called cyclic moisture test.

According to this test the information disk was subjected at a constant relative air humidity of 95% per 24 hours to the following temperature cycle: store at 25° C. for 12 hours, heat from 25° to 65° C. for 2 hours, store at 24° C. for 2 hours, cool from 65° to 25° for 2 hours, heat from 25° to 65° C. for 2 hours, store at 65° C. for 2 hours and cool from 65° to 25° C. for 2 hours. The results demonstrate that the disk according to the invention having a recording layer of $Te_{60}Se_{25}Sb_{10}S_5$ in the above-mentioned circumstances has an average daily increase of the bit error rate of $2.10^{-7}$. The information disk with the known layer of $Te_{33}Sb_{33}Se_{34}$ has an average daily increase of the bit error rate which is 2.5 times as high and has a value of $5 \times 10^{-7}$. From this it may be concluded that the stability of the disk according to the invention is significantly higher than that of the known optical information disk.

This favourable aspect of the optical information disk according to the invention furthermore appears from a further series of tests in which the disk was subjected to the above-described cyclic moisture tests and the laser light transmission ($\lambda = 750$ nm) was periodically determined. The results are shown in FIG. 2. In the graph, the number of days of the cyclic moisture test is plotted on the horizontal axis and the percentage of laser light transmission is plotted on the vertical axis. The solid line indicates the situation of an information disk according to the invention with a recording layer of $Te_{60}Se_{25}Sb_{10}S_5$ while the broken line relates to an information disk having a recording layer of $Te_{33}Sb_{33}Se_{34}$. It can be derived from the graph that the disk according to the invention shows a significantly smaller increase of the transmission than the known disk. This means that the degradation of the recording layer used in the information disk according to the invention occurs very much more slowly than in the known disk. For the increase in transmission is mainly due to the conversion or decomposition of the tellurium constituent of the recording layer to transparent tellurium oxides.

What is claimed is:

1. An optical information disk in which information can be recorded and read optically and which comprises a substrate plate which, on at least one side, has an ablative recording layer comprising the elements tellurium, selenium and antimony, characterized in that the composition of the recording layer satisfies the formula $Te_xSe_ySb_zS_q$ wherein $x = 55$–$85$ at.%, $y = 13$–$30$ at.%, $z = 1$–$12$ at.% $q = 0$–$10$ at.% and $$x+y+z+q=100.$$

2. An optical information disk as claimed in claim 1, characterized in that furthermore the condition is satisfied that $y = a \cdot x + 1.5z - q$ wherein x, y, z and q have the meanings stated in claim 1 and a has the value 0.15–0.30.

3. An information disk as claimed in claim 1, characterized in that the recording layer has the composition $Te_{60}Se_{25}Sb_{10}S_5$.

4. An information disk as claimed in claim 1, characterized in that the recording layer has the composition $Te_{75}Se_{15}Sb_{10}$.

5. An information disk as claimed in claim 1, characterized in that the recording layer has the composition $Te_{75}Se_{15}Sb_5S_5$.

* * * * *

UNITED STATES PATENT AND TRADEMARK OFFICE
CERTIFICATE OF CORRECTION

PATENT NO. : 4,476,214

DATED : October 9, 1984

INVENTOR(S) : PIETER ZALM ET AL

It is certified that error appears in the above-identified patent and that said Letters Patent is hereby corrected as shown below:

Title page should state that

--The portion of this patent subsequent to September 15, 1998 is disclaimed--.

Signed and Sealed this

Twenty-fifth Day of June 1985

[SEAL]

Attest:

DONALD J. QUIGG

Attesting Officer
Acting Commissioner of Patents and Trademarks